US011008757B1

(12) United States Patent
Decker et al.

(10) Patent No.: US 11,008,757 B1
(45) Date of Patent: May 18, 2021

(54) METHOD FOR SECURING MULTIPLE LAYERS OF ROOFING MATERIALS

(71) Applicant: Decker Hall Innovations, LLC, Wellston, OK (US)

(72) Inventors: Andrea L. Decker, Wellston, OK (US); Reba G. Hall, Neptune Beach, FL (US)

(73) Assignee: DECKER HALL INNOVATIONS, LLC, Wellston, OK (US)

( * ) Notice: Subject to any disclaimer, the term of this patent is extended or adjusted under 35 U.S.C. 154(b) by 0 days.

(21) Appl. No.: 16/837,804

(22) Filed: Apr. 1, 2020

(51) Int. Cl.
*E04D 1/34* (2006.01)
*E04D 1/28* (2006.01)
*E04D 11/02* (2006.01)

(52) U.S. Cl.
CPC ............... *E04D 1/34* (2013.01); *E04D 1/28* (2013.01); *E04D 11/02* (2013.01); *E04D 2001/3423* (2013.01); *E04D 2001/3435* (2013.01)

(58) Field of Classification Search
CPC ... E04D 1/34; E04D 2001/3423; E04D 11/02; E04D 2001/3435
See application file for complete search history.

(56) References Cited

U.S. PATENT DOCUMENTS

| | | | | |
|---|---|---|---|---|
| 317,304 A | * | 5/1885 | Condit, Jr. | .......... F16B 15/0007 411/458 |
| 2,570,626 A | * | 10/1951 | Abraham | .................. E04D 1/34 411/458 |
| 2,660,137 A | * | 11/1953 | Abraham | ................ E04D 1/125 52/543 |
| 3,693,496 A | * | 9/1972 | Koide | ................. F16B 15/0007 411/458 |
| 4,592,185 A | | 6/1986 | Lynch et al. | |
| 4,726,996 A | | 2/1988 | Le Gac et al. | |
| 4,779,393 A | * | 10/1988 | Jong | ......................... E04B 2/06 411/388 |
| 5,167,579 A | | 12/1992 | Rotter | |
| D351,335 S | * | 10/1994 | Yazich | .......................... D8/389 |
| 5,571,596 A | | 11/1996 | Johnson | |
| 5,743,693 A | * | 4/1998 | Sobotker, Jr. | ....... F16B 15/0007 411/460 |

(Continued)

FOREIGN PATENT DOCUMENTS

| | | | | |
|---|---|---|---|---|
| CH | | 663069 A5 | * 11/1987 | .......... F16B 15/0007 |
| CH | | 698907 A2 | * 11/2009 | .............. F16B 35/00 |

(Continued)

*Primary Examiner* — Adriana Figueroa
(74) *Attorney, Agent, or Firm* — Dowell & Dowell, P.C.

(57) ABSTRACT

The present invention relates to a method of securing multiple layers of roofing material onto a building with need for ballasting objects. A plurality of roofing panels are installed across a roof deck forming a first layer. Then a plurality of fasteners are installed in each roofing panel of the first layer of roofing panels. Each fastener comprises a base having opposing longitudinal surfaces and a fastening member secured to and extending away from each opposing longitudinal surface. An adhesive is then applied to a surface of either the first layer or a second layer of roofing panels. The plurality of fasteners then perforate the surface of each roofing panel of the second layer to secure the second layer to the first layer, thereby allowing the adhesive to cure, preventing wind from resetting the panels, and without external ballasts.

12 Claims, 9 Drawing Sheets

(56) References Cited

U.S. PATENT DOCUMENTS

| | | | | |
|---|---|---|---|---|
| 6,071,054 A * | 6/2000 | Tebo | ....................... | E04F 15/04 411/459 |
| 7,905,698 B2 * | 3/2011 | Liu | ........................ | B25B 13/48 411/458 |
| 8,057,148 B2 * | 11/2011 | Binkley | .................... | E04D 1/26 411/458 |
| 8,240,101 B2 * | 8/2012 | Binkley | .................. | F16B 15/02 52/543 |
| 9,803,367 B2 | 10/2017 | Rotter | | |
| 10,094,113 B2 | 10/2018 | Hill | | |
| 2004/0234331 A1 * | 11/2004 | Fenton | .................... | F16B 15/02 403/286 |
| 2007/0267555 A1 * | 11/2007 | Signor | ................... | B25B 13/06 248/218.3 |
| 2007/0286704 A1 * | 12/2007 | Signor | ................... | A47G 1/168 411/458 |
| 2008/0222985 A1 | 9/2008 | Hanks et al. | | |
| 2011/0000159 A1 | 1/2011 | Ben-Daat et al. | | |
| 2011/0300386 A1 | 12/2011 | Pardue, Jr. | | |
| 2019/0063479 A1 * | 2/2019 | Eisenmann | ......... | F16B 15/0007 |
| 2019/0301163 A1 | 10/2019 | Phillips | | |

FOREIGN PATENT DOCUMENTS

| | | | | |
|---|---|---|---|---|
| DE | 801181 C | * | 12/1950 | .......... F16B 15/0007 |
| DE | 1911940 A1 | * | 9/1970 | .......... F16B 15/0007 |
| DE | 19709574 A1 | * | 9/1998 | .......... F16B 15/0007 |
| DE | 10315319 A1 | * | 10/2004 | .......... F16B 15/0007 |
| DE | 102006035176 A1 | * | 4/2007 | .......... F16B 15/0007 |
| DE | 102009013824 A1 | * | 9/2010 | ................ B27F 7/00 |
| DE | 202012100346 U1 | * | 5/2013 | ............ F16B 13/128 |
| FR | 439105 A | * | 6/1912 | ................ E04B 1/49 |
| GB | 680410 A | * | 10/1952 | .......... F16B 15/0007 |
| GB | 776390 A | * | 6/1957 | .......... F16B 15/0007 |
| GB | 2161749 A | | 1/1986 | |

* cited by examiner

METHOD FOR SECURING MULTIPLE LAYERS OF ROOFING MATERIALS

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX SUBMITTED ON A COMPACT DISC

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present invention relates generally to the installation of roofing materials onto a building roof or similar structure, and more specifically to a method of securing multiple layers of roofing material onto a building roof.

Brief Discussion of the Prior Art

Currently in the field of commercial roof installation, multiple layers of Isocyanurate (ISO) insulation boards are applied to a roof of a commercial building, as opposed to the asphalt, slate, or cedar shingles of residential buildings. Each ISO board is rectangular or square in shape, and the boards are usually installed in rows along a roof deck. A bottom layer of ISO board is mechanically attached to the roof deck in a pattern as designated by the roofing manufacturer for the designated wind speed. A second layer of ISO board is installed over the first layer, and the two layers are typically secured together with foam adhesive applied in a ribbon pattern with spacing as designated by the roofing manufacturer for the designated wind speed.

When a roofing contractor applies the foam adhesive to an exposed surface of the first row of ISO boards, the contractor will then set the second layer of ISO boards into the foam adhesive. The contractor then will hold the second layer of ISO boards in position over the first layer of boards by placing five-gallon buckets, or similar ballasts, on top of the second layer. The five-gallon buckets used in this manner are the same buckets that previously contained the foam adhesive used to adhere the single ply membrane to the ISO in a final step of the roofing assembly.

The five-gallon buckets are used as a ballast to help hold the second, or top, layer of ISO boards in place as the foam adhesive expands and cures to permanently secure the second layer of ISO boards to the first layer of ISO boards. The five-gallon buckets also will help to hold the ISO boards in place if winds speeds are high enough that the second layers of ISO boards may be moved before the foam adhesive cures.

Since the inception of foam adhesives, five-gallon buckets have been used as a ballast for this process and are even recommended by the foam adhesive manufacturers in their demonstrations to hold the ISO boards in place until the foam adhesive permanently cures. Bags of sand have also optionally been used for the same purpose, namely to act as a ballast for securing the second layer of ISO boards until the foam adhesive has cured between the first and second layers of ISO boards.

However, as self-adhered technology in the roofing ply membranes becomes more prevalent and improves, there are less and less five-gallon buckets of membrane adhesive on-site during installation. Further, buckets and sand bags will not work safely on high-pitched or sloped roofs. Wind prone geographical markets, such as Hawaii and Seattle, also have problems with this type of application, even with five-gallon buckets used as a ballast. If high wind causes boards from the second layer to disengage from the adhesive and first layer before the adhesive cures, the roofers will have to re-set the board. In the end, re-set insulation boards will look like the other boards, but will not perform as designed. In many cases, the performance will drop by 80 or more percent.

Therefore, there is a need in the art to improve the process by which such roofing materials are installed and secured.

BRIEF SUMMARY OF THE INVENTION

The primary object of the instant disclosure is to teach an improved process for installing multiple layers of roofing materials. According to a preferred embodiment of the present invention, a method for installing layered roofing panels comprises securing a plurality of roofing panels across a roof deck, the plurality of roofing panels forming a first layer of roofing panels; installing a plurality of fasteners in each roofing panel of the first layer of roofing panels, each fastener comprising a base having opposing longitudinal surfaces, wherein a fastening member is secured to and extends away from each opposing longitudinal surface, and wherein each fastening member is depressed into a roofing panel such that each opposing longitudinal surface contacts a corresponding roofing panel; adhering a plurality of roofing panels forming a second layer of roofing panels along an adhering surface of each roofing panel of the second layer and an exposed surface of each of the roofing panels of the first layer; and depressing the plurality of fasteners through the adhering surface of each roofing panel of the second layer to secure the second layer to the first layer.

A further object of the instant invention includes teaching an embodiment of the process wherein an adhesive is applied to the exposed surface of each roofing panel of the first layer.

A further object of the instant invention includes teaching an embodiment of the process wherein an adhesive is pre-applied to the adhering surface of each roofing panel of the second layer.

A further object of the instant invention includes teaching an embodiment of the process wherein each fastener of the plurality of fasteners has fastening members of equal length.

A further object of the instant invention includes teaching an embodiment of the process wherein one fastening member of each fastener is longer than another fastening member of the same fastener.

A further object of the instant invention includes teaching an embodiment of the process wherein each fastening member further comprises a pointed tip along a free end for piercing the roofing panels.

A further object of the instant invention includes teaching an embodiment of the process wherein each fastening member includes a series of circumferential protrusions, each protrusion coaxially extending away from the fastening member, and the series of circumferential protrusions extending along the length of each fastening member.

A further object of the instant invention includes teaching an embodiment of the process wherein at least one fastening member of each fastener is helically shaped such that each fastener may be rotatably secured into a roofing panel.

A further object of the instant invention includes teaching an embodiment of the process wherein at least one fastening member of each fastener is not angled perpendicularly relative to the base.

A better understanding of the embodiments of the method will be had with reference to the several views of the drawings, described herein.

BRIEF DESCRIPTION OF THE SEVERAL VIEWS OF THE DRAWING

The present invention is shown and described in the following drawings.

A better understanding of the embodiments of the method will be had with reference to the detailed description, described herein.

DETAILED DESCRIPTION OF THE INVENTION

In the following detailed description, embodiments for installing multiple layers of roofing materials are described by providing reference to the accompanying drawings which form a part of the description of how the invention works. The accompanying drawings do not limit the scope of the present invention. The present invention solves the problems associated with ballasting multiple layers of roofing materials with removable objects by instead inserting a plurality of double-sided fasteners between each layer of roofing material whereby ballasting objects are no longer required.

It will be appreciated that for simplicity and clarity of illustration, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Figure 1:
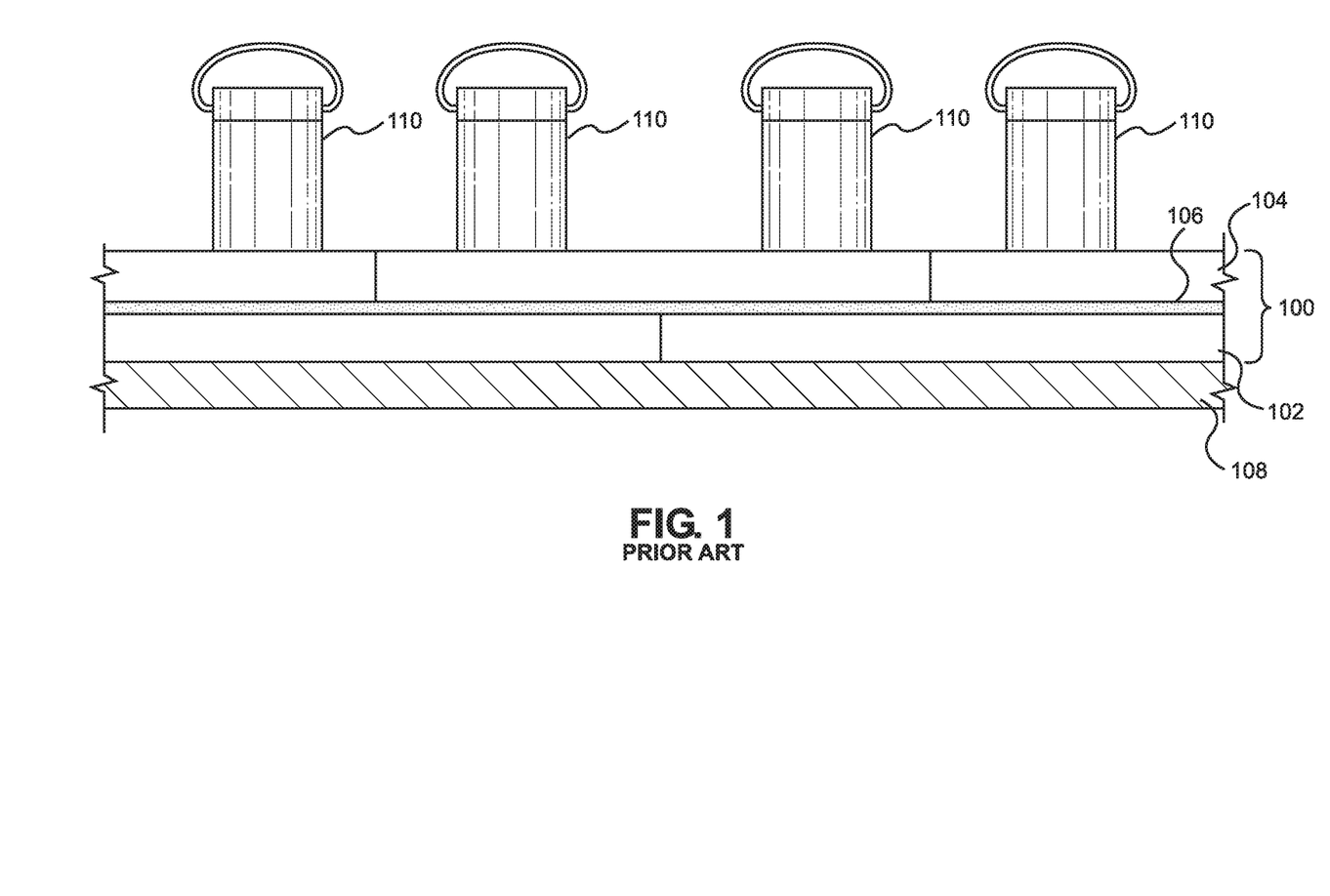
FIG. 1 shows a cross-sectional view of a roof installed according to a prior art process for installing multiple layers of roofing panels, including using five-gallon buckets as ballasts.

FIG. 1 shows a prior art embodiment of a method for installing multiple layers of roofing materials. The installed roof 100 includes a first layer 102 and a second layer 104 of roofing material, typically Isocyanurate (ISO) insulation boards or similar material. Each layer 102 and 104 includes a plurality of boards that are rectangular or square in shape, the boards being installed in rows along a roof deck 108. The first layer 102 is mechanically attached to the roof deck in a pattern as designated by the roofing manufacturer for the designated wind speed. An adhesive layer 106 is then applied to an exposed surface of the first layer 102, the adhesive layer including an adhesive known and widely used in the roofing industry for such purposes. The second layer 104 is then installed over the first layer 102, and the two layers are secured with the adhesive layer 106. However, the adhesive used in the adhesive layer 106 does not bond instantly, and a plurality of ballast objects 110, typically five-gallon buckets that originally contained the adhesive used in the adhesive layer, are placed on top of the second layer 104 to weigh down the second layer of roofing materials to prevent resetting of individual boards within the second layer. Resetting occurs when the boards of the first and second layers 102 and 104 are fully or partially separated before the adhesive layer 106 has fully cured, and the layers are subsequently forced back together to form a complete set of layers. Resetting dramatically reduces the designed effectiveness of the roofing materials, oftentimes by 80 or more percent. Wind is the primary cause for the resetting of roofing materials.

Figure 2:
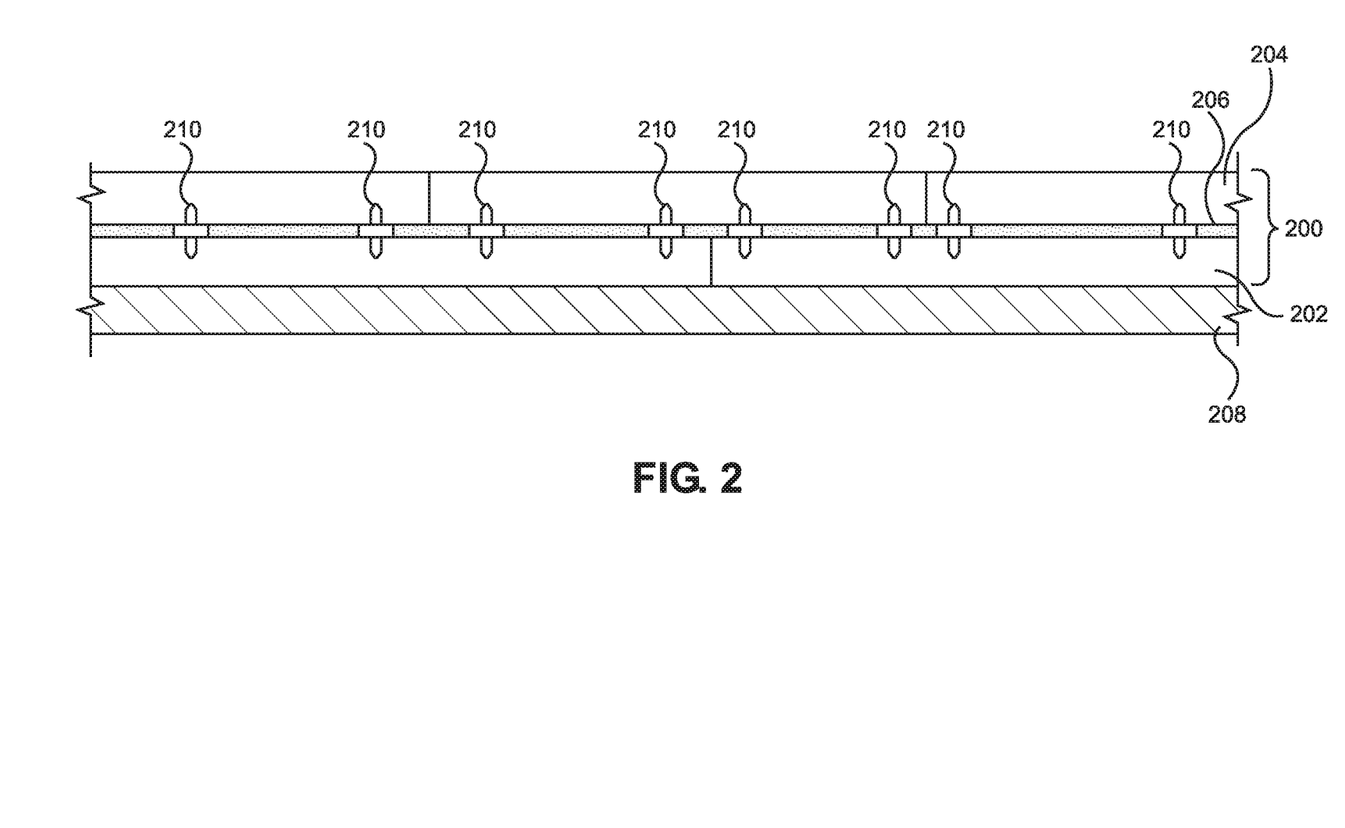
FIG. 2 shows a cross-sectional view of a roof installed according to an embodiment of the instant invention.

A cross-sectional view of a roof 200 installed using the preferred embodiment of a method for installing multiple layers of roofing materials is provided in FIG. 2. The installed roof 200 includes a first layer 202 of roofing materials, a second layer 204 of roofing materials, an adhesive layer 206, and a plurality of fasteners 210. The first layer 202 includes a plurality of roofing panels, such as ISO boards, or similar structures arranged upon and secured to a roof deck 208. Such roof decks are typically found on commercial or public buildings, i.e. non-residential or non-single family home buildings, and may be horizontal, pitched, or a combination of both. The second layer 204 includes a plurality of roofing panels that are typically, but not necessarily, identical to the roofing panels used in the first layer 202. Further, arrangement of roofing panels in the first and second layers 202 and 204 is typically offset or staggered such that ends of a roofing panel in the first layer do not form continuous surfaces with ends of a roofing panel in the second layer.

The adhesive layer 206 may include foam adhesive, or a suitable substitute known in the art, that is applied to an exposed surface of the first layer 202. Alternatively, the adhesive layer may be formed by a pre-applied adhesive that is manufactured onto a surface of each roofing panel of the second layer 204. This form of adhesive layer has become more prevalent in recent years and is one of the driving factors in the conception of the instant method. With pre-applied adhesive, there are no five-gallon buckets to use as ballasts to ensure proper curing of the adhesive layer, as the five-gallon buckets hold the foam adhesive that is applied to the first layer. If that type of adhesive is not used, there are no adequate ballasts, in form or number, on site necessary to hold down the second layer 202.

Each fastener of the plurality of fasteners 210 are double-sided such that the fastener may simultaneously pierce both the first layer 202 and the second layer 204 of roofing materials. Various embodiments of the fastener 210 are envisioned and described further herein. Utilizing double-sided fasteners 210 for the first time in the process of installing multiple layers of roofing materials provides multiple benefits over the known method of ballasting the layers with objects. First, the fasteners are cheap, easy to use, and are easily transported to and from project sites. Fasteners are also not dependent on the type or form of adhesive used to bond the one or more layers of roofing materials together. Where ballasting objects were not practical or possible to use on pitched roofs, fasteners are usable no matter the pitch of the roof. Lastly, the double-sided fasteners secure the layers in both the horizontal direction and the vertical direction, whereas ballasting the layers only provided security in the vertical direction.

FIGS. 3A-9B depict multiple embodiments of the fasteners that may be used in the processes described herein to install roofs having such multiple layers.

Figure 3A:
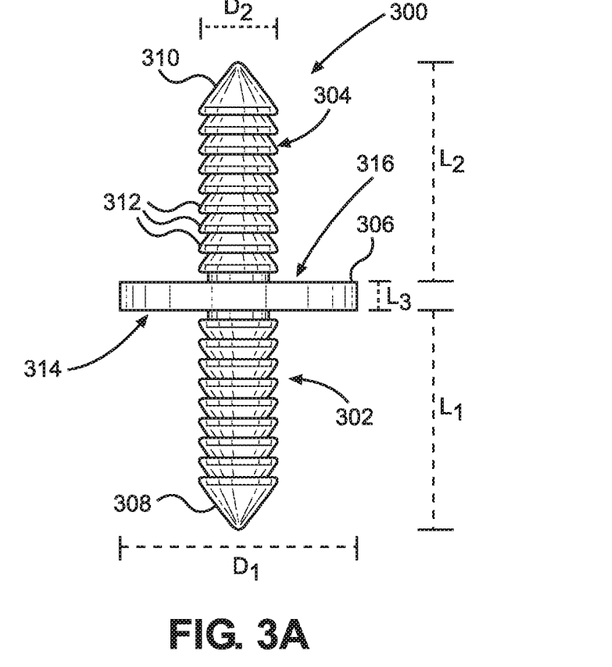
FIG. 3A shows a side view of a fastener according to an embodiment of the instant invention.
Figure 3B:
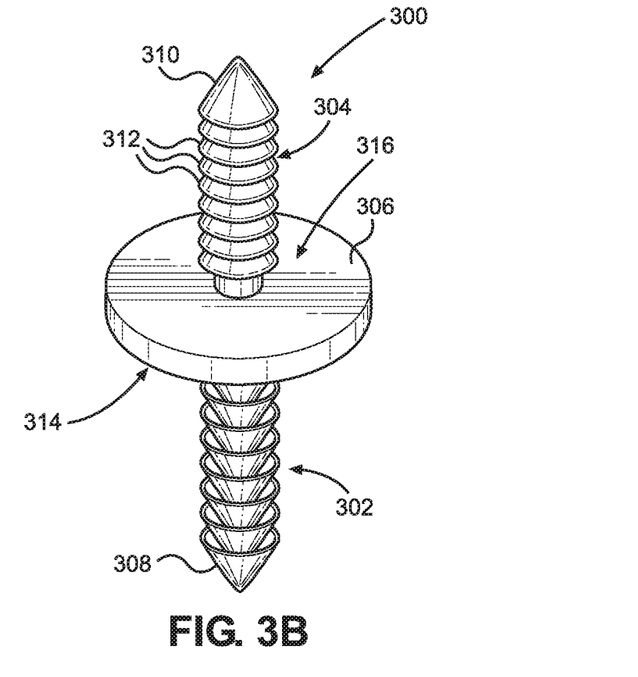
FIG. 3B shows a perspective view of the fastener shown in FIG. 3A.

FIGS. 3A-3B show a preferred embodiment of a fastener 300 for use in the inventive process. A side view of the preferred fastener 300 embodiment is shown in FIG. 3A. The fastener 300 has a base 306 with opposing longitudinal surfaces 314 and 316 that are parallel to each other. Fastening members 302 and 304 are secured to and extend away from each opposing longitudinal surface 314 and 316, such that the two fastening members extend directly away from each other. In this embodiment, each fastening member 302 and 304 and base 306 are coaxial. Further, each fastening member 302 and 304 includes a series of circumferential protrusions 312, each protrusion coaxially extending away from each fastening member, the series of circumferential protrusions extending along the length of each fastening member. Each fastening member 302 and 304 also has a tip 308 and 310, respectively, attached at a free end that is pointed or tapered to allow each fastening member to more easily pierce or puncture roofing materials. The fastening members 302 and 304 have lengths $L_1$ and $L_2$, respectively. In this embodiment $L_1$ and $L_2$ are the same value, for example, 25.4 mm (millimeters), or 1" (inches). Further embodiments are envisioned with different values for $L_1$ and $L_2$, as necessary to meet specifications of roofing materials, wherein the value of $L_1$ is the same as $L_2$. The base 306 has a diameter $D_1$ and a length, or height, $L_3$. In this embodiment, $D_1$ is 22.225 mm, or 7/8", and $L_3$ is 3.175 mm, or 1/8", but these values may vary as necessary to meet specifications of roofing materials. $D_2$ is the diameter of the fastening members 302 and 304. In this embodiment, $D_2$ is 4.7625 mm, or 3/16", with an acceptable variance of plus or minus 1.5875 mm, or 1/16". Other values of $D_2$ are acceptable, as long as the fastening members 302 and 304 are thick enough to easily pierce roofing tiles and withstand shearing forces during lateral movement of roofing tiles, for example, in response to wind forces. Acceptable variance of given $L_1$, $L_2$, and $D_1$ values between similar fasteners discussed herein is plus or minus 0.7938 mm, or 1/32". The fastener 300 is designed to be used with roofing material layers being at least 25.4 mm, or 1", thick. FIG. 3B shows the fastener 300 from a perspective view. Length and diameter values are preferably consistent between the fastening members 302 and 304, but it is conceived that such values may differ. For example, $D_2$ may have different values between fastening members 302 and 304.

Figure 4:
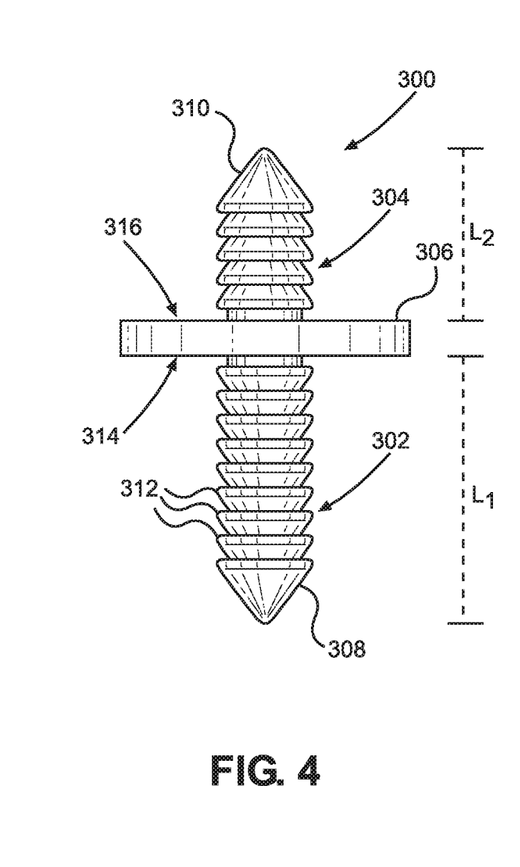
FIG. 4 shows a side view of a fastener according to another embodiment of the instant invention.

FIG. 4 shows an alternative embodiment of the fastener 300 shown in FIGS. 3A and 3B, namely wherein $L_1$ and $L_2$ do not have identical values. In this embodiment, $L_1$ is 25.4 mm, or 1", and $L_2$ is 12.7 mm, or 1/2". In this embodiment, different values of $L_1$ and $L_2$ are envisioned, as necessary to meet specifications of roofing materials, just so long as the value of $L_1$ is different from $L_2$. Such a configuration is advantageous for roofing materials with tapered edges. With such materials, the fastener 300 of FIG. 4 could be used along the tapered edges, while the fastener of FIGS. 3A and 3B could be used elsewhere along the full thickness of the roofing material. With all embodiments of the fasteners described herein, the fasteners should only penetrate the roofing materials along one surface.

Figure 5:
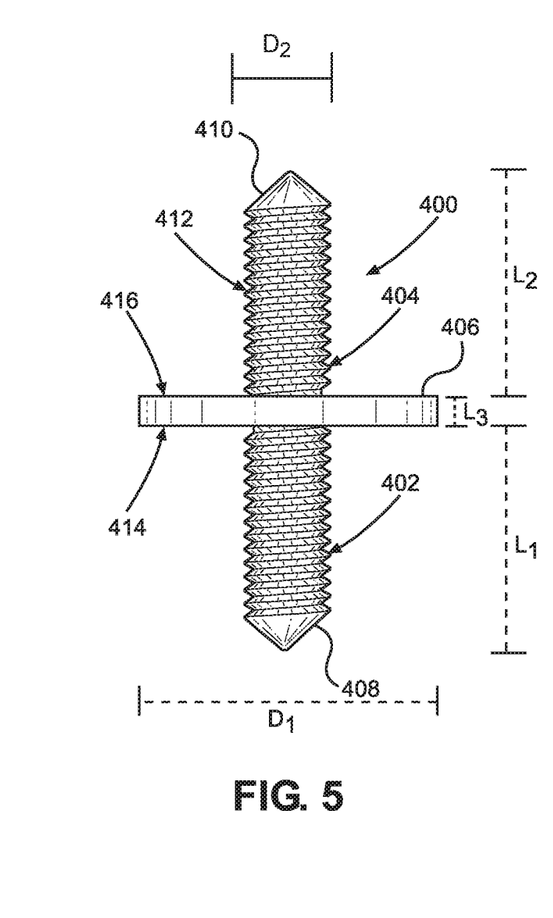
FIG. 5 shows a side view of a fastener according to another embodiment of the instant invention.

FIG. 5 shows another embodiment of the fastener 400 having helical protrusions 412 on one or both of a pair of fastening members 402 and 404. As with the preferred embodiment, the fastener 400 has a base 406 with opposing longitudinal surfaces 414 and 416 that are parallel to each other. Fastening members 402 and 404 are secured to and extend away from each opposing longitudinal surface 414 and 416, such that the two fastening members extend directly away from each other. In this embodiment, each fastening member 402 and 404 and base 406 are coaxial. Unlike the earlier described fastener 300, the fastener 400 has the helical protrusions 412 extending along the length of each fastening member 402 and 404, much like a screw. Each fastening member 402 and 404 also has a tip 408 and 410, respectively, formed at a free end that is pointed or tapered to allow each fastening member to more easily pierce or puncture roofing materials. The fastening members 402 and 404 have lengths $L_1$ and $L_2$, respectively. In this embodiment $L_1$ and $L_2$ are the same value, for example, 25.4 mm, or 1". However, further embodiments are envisioned with different values for $L_1$ and $L_2$, as necessary to meet specifications of roofing materials. As with the embodiments shown in FIGS. 3A-3B and FIG. 4, $L_1$ and $L_2$ may have the same value or may have different values. The base 406 has a diameter $D_1$ and a length, or height, $L_3$. $D_2$ is the diameter of the fastening members 402 and 404. The values for $L_1$, $L_2$, $L_3$, $D_1$, $D_2$ are preferably the same as fastener 300, but may vary as required, just as with fastener 300.

Figure 6:
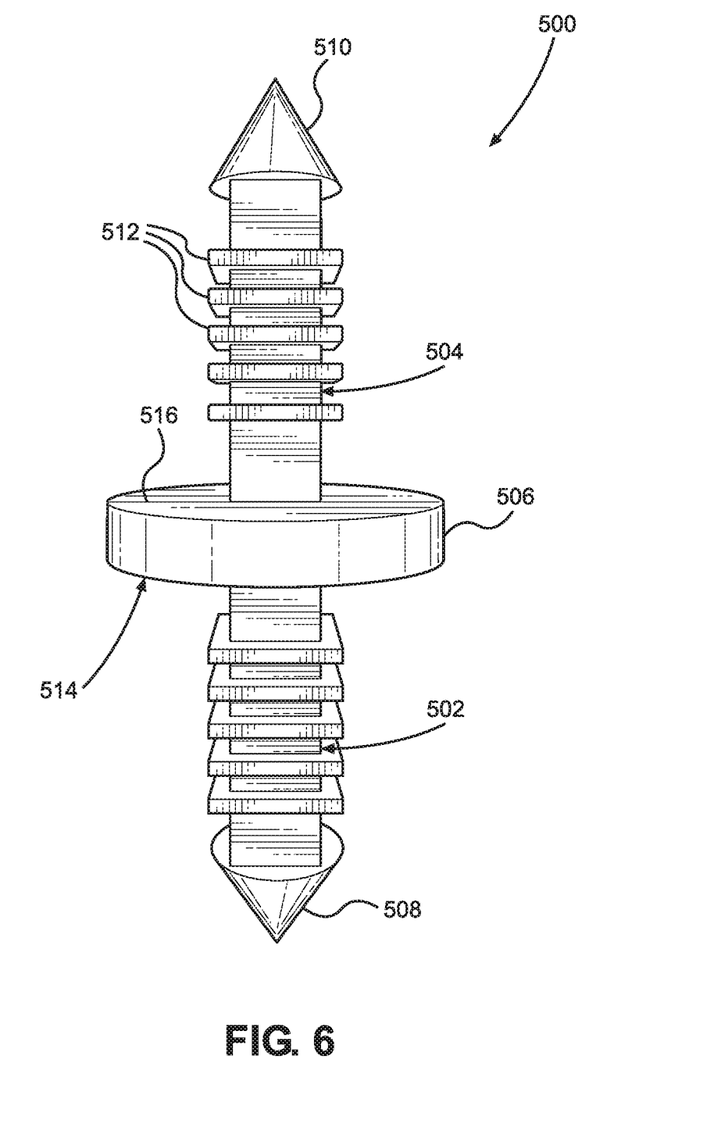
FIG. 6 shows a perspective view of a fastener according to another embodiment of the instant invention.

FIG. 6 shows another embodiment of the fastener 500 having planar protrusions 512 on each fastening member 502 and 504. As with the preferred embodiment, the fastener 500 has a base 506 with opposing longitudinal surfaces 514 and 516 that are parallel to each other. A fastening member 502 and 504 is secured to and extends away from each opposing longitudinal surface 514 and 516, such that the two fastening members extend directly away from each other. Each fastening member 502 and 504 and base 506 are also coaxial. Unlike the earlier described fasteners 300 and 400, the fastener 500 has a series of planar protrusions 512 extending along the length of each fastening member 502 and 504. Further, each fastening member 502 and 504 has a square cross-section when viewed from either the top or bottom, unlike the circular cross-sections of the fasteners 300 and 400. In this embodiment, the protrusions 512 are also square-shaped when viewed from the top or bottom and are coaxial with each fastening member 502 and 504. Each fastening member 502 and 504 also has a tip 508 and 510, respectively, attached at a free end that is pointed or tapered to allow each fastening member to more easily pierce or puncture roofing materials. Each tip 508 and 510 is conical in shape, but could also be pyramidal. The fastening members 502 and 504 have lengths L1 and L2, respectively. In this embodiment $L_1$ and $L_2$ are the same value, for example, 25.4 mm, or 1". However, further embodiments are envisioned with different values for $L_1$ and $L_2$, as necessary to meet specifications of roofing materials. As with earlier-discussed embodiments, $L_1$ and $L_2$ may have the same value or may have different values. The base 406 has a diameter $D_1$ and a length, or height, $L_3$. As the fastening members 502 and 504 have a square cross-section, there is no diameter $D_2$ measurement. However, each fastening member 502 and 504 has consistent width, other than along the protrusions 512, that is similar to the values of $D_2$ in other disclosed embodiments of the fastener. The fastener 500 of this embodiment has the advantage of being easier to manufacture via a 3D-printer, as more angular objects, as opposed to more rounded objects, are simpler to produce.

Figure 7:
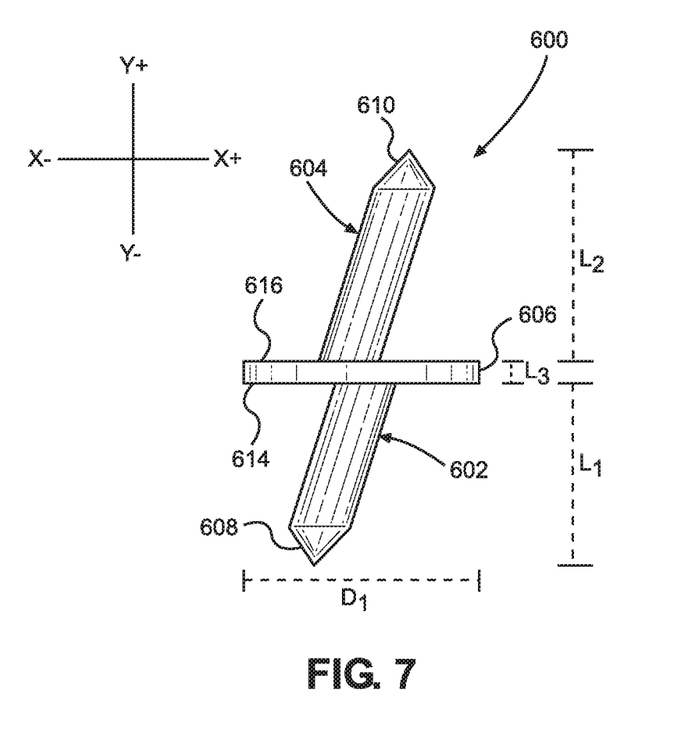
FIG. 7 shows a side view of a fastener according to another embodiment of the instant invention.
Figure 8:
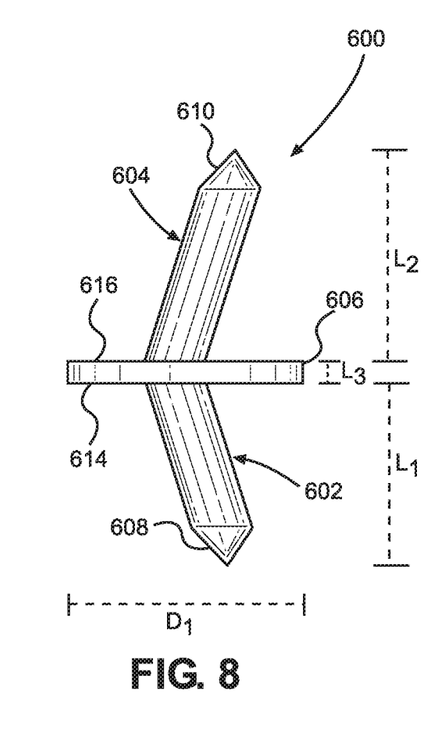
FIG. 8 shows a side view of a fastener according to another embodiment of the instant invention.

FIGS. 7 and 8 show two alternate embodiments of the fastener 600. As with the preferred embodiment, the fasteners 600 have a base 606 with opposing longitudinal surfaces 614 and 616 that are parallel to each other. A fastening member 602 and 604 is secured to and extends away from each opposing longitudinal surface 614 and 616. However, unlike the preferred embodiment, each fastening member 602 and 604 and base 606 are not coaxial. Each fastening member 602 and 604 are angled relative to the base 606 at an angle other than 90° (degrees). In other words, the fastening members 602 and 604 are not perpendicular to the base 606. In FIG. 7, the fastening members are angled in opposite directions, such that one fastening member 602 is angled in the X− direction and the other fastening member 604 is angled in the X+ direction. In FIG. 8, both fastening members are angled in the same direction, for example, in the X+ direction. Each fastening member 602 and 604 has a tip 608 and 610, respectively, attached at a free end that is pointed or tapered to allow each fastening member to more easily pierce or puncture roofing materials. Each tip 608 and 610 is conical in shape, but could also be pyramidal. The fastening members 602 and 604 have lengths $L_1$ and $L_2$, respectively. In this embodiment $L_1$ and $L_2$ are the same value, for example, 25.4 mm, 1". However, further embodiments are envisioned with different values for $L_1$ and $L_2$, as necessary to meet specifications of roofing materials. As with earlier-discussed embodiments, $L_1$ and $L_2$ may have the same value or may have different values. The base 606 has a diameter $D_1$ and a length, or height, $L_3$. The fastening members 602 and 604 may have protrusions 312, 412, 512 or the like to the preceding embodiments 300, 400, or 500. However, the angled fastening members 602 and 604 of the fastener 600 are meant to provide sufficient forces to secure both layers of roofing materials. Further, the fastening members 602 and 604 have similar diameters to the diameters ($D_2$) of fastening members of other fastener embodiments. As with other fastener embodiments, fastener 600 may have different dimensions to accommodate specific roofing materials, as long as the fastener 600 does not pierce completely through the roofing materials of either layer during installation and provides sufficient support against wind and other environmental forces acting on the roofing materials.

Figure 9A:
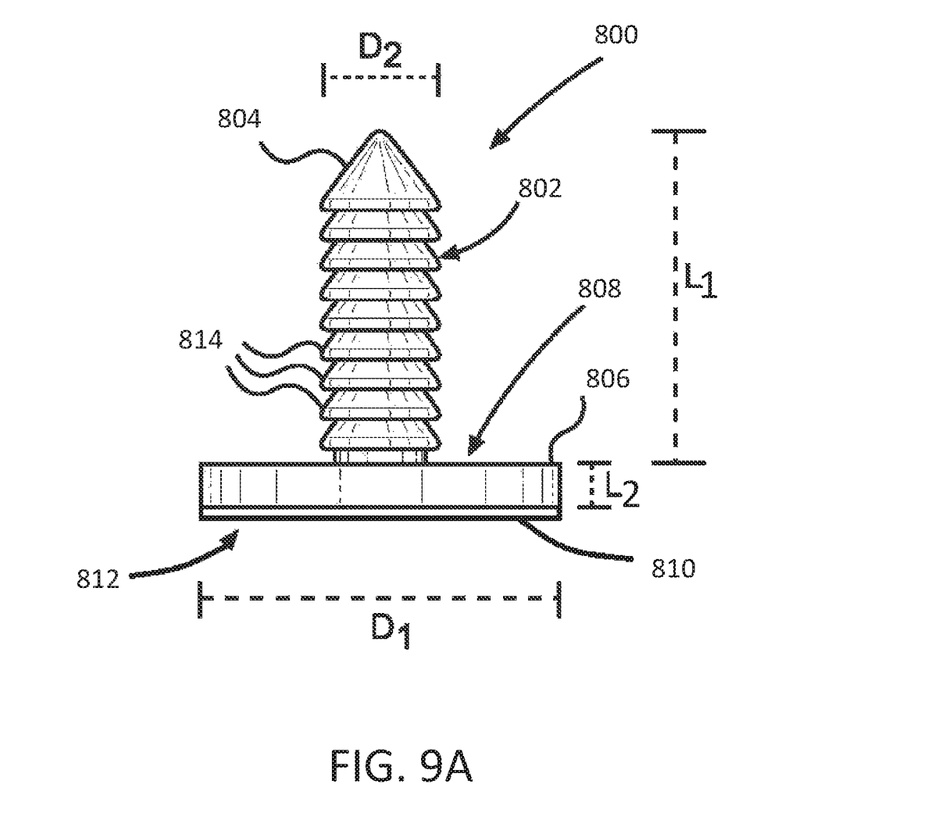
FIG. 9A shows a side view of a fastener according to another embodiment of the instant invention.
Figure 9B:
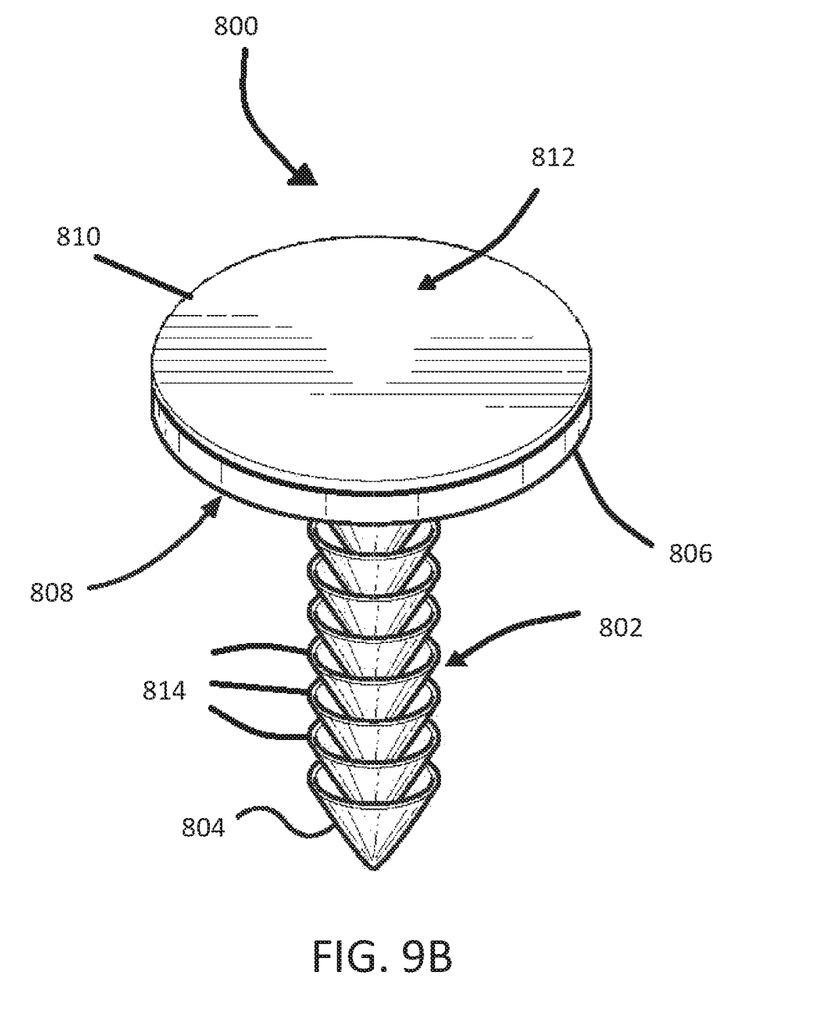
FIG. 9B shows a perspective view of the fastener according to the embodiment shown in FIG. 9A.

FIGS. 9A and 9B show another embodiment of a fastener 800 for the instant invention. The fastener 800 has a base 806 with opposing longitudinal surfaces 808 and 812 that are parallel to each other. A fastening member 802 is secured to and extends away from longitudinal surface 808. Unlike other embodiments of the fastener, this fastener 800 has only one fastening member 802. The fastening member 802 includes a tip 804 attached at a free end and a series of circumferential protrusions 814, each protrusion coaxially extending away from the fastening member, the series of circumferential protrusions extending along the length of the fastening member. The tip 804 is conical in shape, but could also be pyramidal.

An adhesive layer 810 is provided along longitudinal surface 812. The adhesive layer 810 includes an adhesive that may be of any type commercially viable to bind with different construction materials, including, but not limited to, concrete, metal decks, cementitious wood fiber, and gypsum. The adhesive layer 810 may also include a removable layer that protects the adhesive underneath until such time that the fastener 800 is secured to roofing materials. Once the removable layer is removed, the adhesive underneath is bindable to a roofing material or similar construction material.

The fastener 800 is intended to be bound to materials in either a first layer or a second layer that a fastening member 802 cannot puncture. For example, the fastener 800 is attached to a bottom concrete layer or roof bed along longitudinal surface 812 via the adhesive layer 810. Fastening member 802 would not be able to puncture the concrete layer. The fastening member 802 then punctures a layer of typical roofing panels applied over the bottom layer of concrete.

The fastening member 802 has a length $L_1$, which in this embodiment may equal 25.4 mm, or 1". Further embodiments are envisioned with different values for $L_1$, as necessary to meet specifications of roofing materials. $D_2$ is the diameter of the fastening member 802. In this embodiment, $D_2$ is 4.7625 mm, or 3/16", with an acceptable variance of plus or minus 1.5875 mm, or 1/16". Other values of $D_2$ are acceptable, as long as the fastening member 802 is thick enough to easily pierce roofing tiles and withstand shearing forces during lateral movement of roofing tiles, for example, in response to wind forces. The base 806 has a diameter $D_1$ and a length, or height, $L_2$. In this embodiment, $D_1$ is 63.5 mm, or 2½", and $L_2$ is 3.175 mm, or ⅛", but these values may vary as necessary to meet specifications of roofing materials. $D_1$ is typically larger in this fastener 800 embodiment, relative to other fastener embodiments. Acceptable variance of given $L_1$, $L_2$, $D_1$, and $D_2$ values between similar fasteners discussed herein is plus or minus 0.7938 mm, or 1/32". The fastener 800 is designed to be used with roofing material layers being at least 25.4 mm, or 1" thick. As with other fastener embodiments, fastener 800 may have different dimensions to accommodate specific roofing materials, as long as the fastener 800 does not pierce completely through a roofing materials layer during installation and provides sufficient support against wind and other environmental forces acting on the roofing materials.

Figure 10:
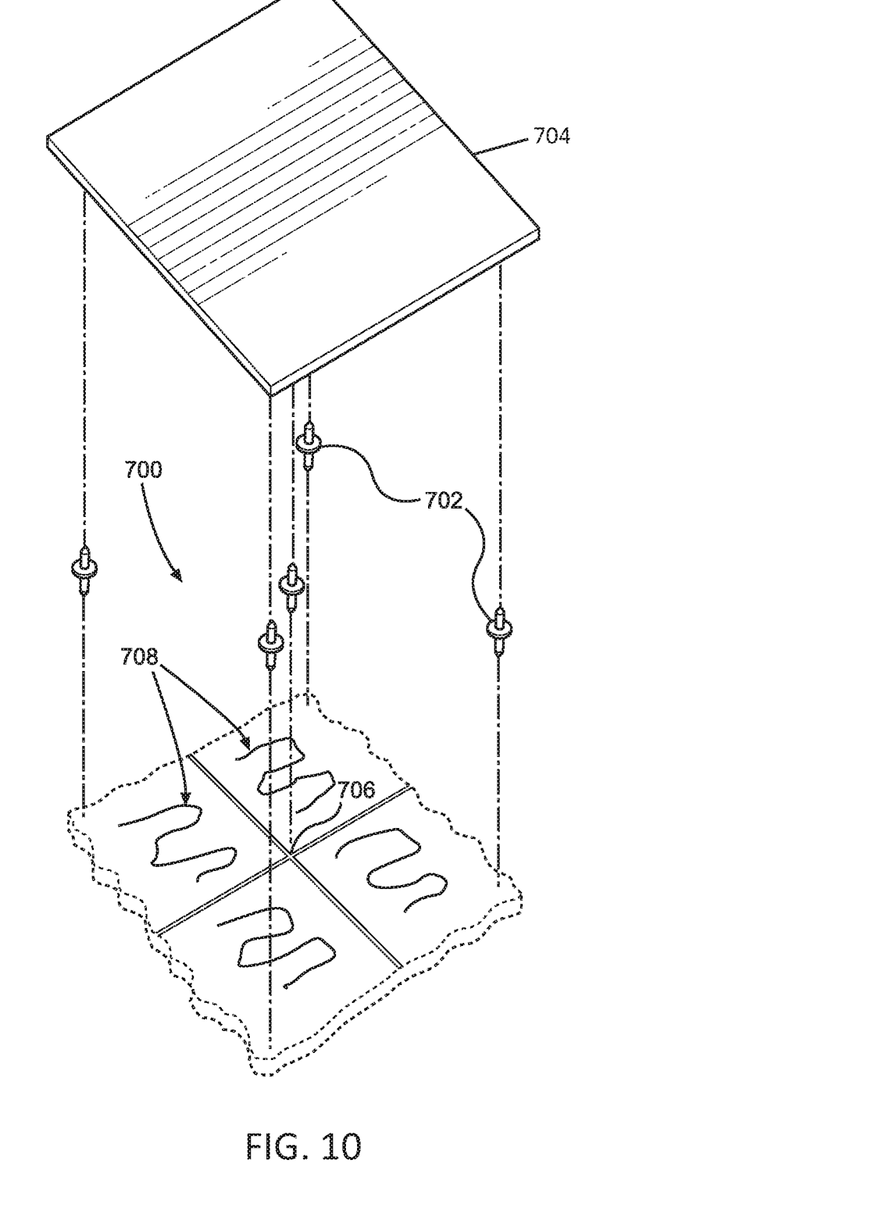
FIG. 10 shows an exploded view of an upper roof panel secured to a layer of lower roof panels via fasteners and adhesive according to an embodiment of the instant invention.

FIG. 10 shows an exploded view of an installed roof 700 utilizing the process of the instant disclosure. The process begins by securing a plurality of roofing panels across a roof deck to form a first layer 706 of roofing panels. The first layer 706 is mechanically attached to the roof bed, as is standard in the art. The first layer 706 is uniformly level and continuous along the plurality of roofing panels to evenly and fully cover the roof bed without exposing the roof bed.

Next, a plurality of fasteners 702 are installed in each roofing panel of the first layer 706 of roofing panels. Each fastener 702 is installed by perforating a roofing panel of the first layer 706 with a length of a fastening member. A base of each fastener 702 provides a mechanical stop on the fastening member to prevent penetration of both surfaces of the roofing panel. Each fastener 702 may comprise any of the fastener embodiments disclosed herein or further embodiments of fasteners comprising a combination of features shown and described among the various fastener embodiments or equivalents of such features. Installation of the plurality of fasteners preferably includes evenly distributing fasteners around a perimeter of each roofing panel and also at or around a center of each roofing panel. Importantly, the fastener should only perforate an exposed or upper surface of a corresponding roofing panel of the first layer 706. Perforating both surfaces, or in other words entirely through the first layer, would create unwanted paths for water or air to enter between the first layer 706 and roof bed.

Next, an adhesive 708 is provided to create an adhesive layer between the first layer 706 and a second layer 704 of roofing panels. The adhesive 708 may be applied directly to the exposed surface of the first layer 706, as shown in FIG. 10, or may come pre-formed on a contact, or bottom, surface of the roofing panels of the second layer 704. Specific adhesives of any type normally used in the art are usable in embodiments of the instant method.

A plurality of roofing panels forming the second layer 704 are then applied to the exposed surface of the first layer 706. In applying the second layer 704, an exposed fastening member of each fastener 702 is forced into and perforates the contact surface of a roofing panel of the plurality of roofing panels of the second layer 704, such that each fastener has a fastening member perforating the first layer 706 and another fastening member perforating the second layer 704. As with the first layer 706, the other fastening member does not perforate both opposing surfaces of the second layer 704 roofing panels. The adhesive layer is formed between the first and second layers 706 and 704, which includes a base of each fastener and the adhesive 708 applied. The adhesive 708 contacts both the first and second layers 706 and 704 and expands as it cures. Unlike current applications, this method of installing multiple layers of roofing materials does not require any further ballast or weight to be applied to an upper surface of the second layer 704. Any fastener embodiment described herein may be used in the described method as the fastener 702, as best suited for the corresponding substrates, materials, structural factors, and/or environmental factors present.

The fastener 800 embodiment can also be used, but is used slightly differently than other fastener embodiments, as it only perforates one layer of roofing panels. The fastening member 802 would most often be used to perforate the second layer 704, while the adhesive layer 810 would bind the fastener 800 to the first layer 706. The fastener 800 is structured to bind two layers of roofing materials together, wherein one of the two layers is not puncturable by a fastening member. Most often, the first layer, or bottom layer, would include the non-puncturable materials. However, it is conceivable that the non-puncturable materials would be arranged in the second layer, while puncturable materials are located in the first layer. In such circumstances, the fastener 800 would still be operable with the fastening member 802 puncturing the first layer 706 and the adhesive layer 810 binding to the second layer 704. In either case, only one of the layers 704 or 706 is perforated by the fastener 800. Additionally, fastener 800 may be used to assist with the attachment of the first layer 706 to the roof bed, with the fastening member 802 puncturing the roofing panels of the first layer and the adhesive layer 810 binding the fastener to the roof bed. The adhesive of the adhesive layer 810 would preferably cure and bind much quicker than the adhesive 708

We claim:

1. A method for installing layers of roofing panels, comprising: securing a plurality of roofing panels across a roof deck, the plurality of roofing panels forming a first layer of roofing panels;

installing a plurality of fasteners in each roofing panel of the first layer of roofing panels, each fastener comprising a base having opposing longitudinal surfaces and fastening members secured to and extending away from each opposing longitudinal surface, wherein one fastening member of the fastening members of each fastener of the plurality of fasteners is depressed into an exposed surface of the respective roofing panel of the first layer of roofing panels such that the corresponding opposing longitudinal surface from which the one fastening member extends contacts the respective roofing panel of the first layer of roofing panels;

installing a plurality of roofing panels forming a second layer of roofing panels over the first layer of roofing panels, wherein each roofing panel of the second layer of roofing panels is secured to multiple roofing panels of the first layer of roofing panels by at least one depressed fastener per roofing panel of the first layer of roofing panels, wherein an exposed fastening member of each depressed fastener is depressed into an adhesive surface of the respective roofing panel of the second layer of roofing panels such that an exposed longitudinal surface of each fastener contacts the adhesive surface of the respective roofing panel of the second layer of roofing panels; and providing an adhesive between the first layer and the second layer of roofing panels, wherein, for each fastener of the plurality of fasteners, the fastening members do not perforate completely through the respective roofing panel of the second layer of roofing panels and do not perforate completely through the respective roofing panel of the first layer of roofing panels.

2. The method of claim 1, further comprising applying the adhesive to the exposed surface of each roofing panel of the first layer of roofing panels.

3. The method of claim 1, wherein the adhesive is pre-applied to the adhesive surface of each roofing panel of the second layer of roofing panels.

4. The method of claim 1, wherein each fastener of the plurality of fasteners has fastening members of equal length.

5. The method of claim 1, wherein one fastening member of the fastening members of each fastener is longer than another said fastening member.

6. The method of claim 1, wherein each fastening member further comprises a pointed tip along a free end for piercing the roofing panels.

7. The method of claim 1, each fastening member includes a series of circumferential protrusions, each protrusion coaxially extending away from the fastening member, and the series of circumferential protrusions extending along the length of each fastening member.

8. The method of claim 1, wherein at least one fastening member of each fastener is helically shaped such that each fastener may be rotatably secured into a roofing panel.

9. The method of claim 1, wherein at least one fastening member of each fastener is not angled perpendicularly relative to the base.

10. The method of claim 1, wherein one or more ballasts are not placed on top of the second layer after the second layer is secured to the first layer of roofing panels.

11. A method for installing layers of roofing panels, comprising: securing a plurality of roofing panels side by side across a roof deck, the plurality of roofing panels forming a first layer of roofing panels;
 installing a plurality of fasteners in each roofing panel of the first layer of roofing panels, each fastener comprising a base having opposing longitudinal surfaces and fastening members secured to and extending away from each opposing longitudinal surface, wherein one fastening member of the fastening members of each fastener of the plurality of fasteners is depressed into an exposed surface of the respective roofing panel of the first layer of roofing panels such that the corresponding opposing longitudinal surface from which the one fastening member extends contacts the respective roofing panel of the first layer of roofing panels;
 installing a plurality of roofing panels side by side forming a second layer of roofing panels over the first layer of roofing panels, wherein each roofing panel of the second layer of roofing panels is secured to multiple roofing panels of the first layer of roofing panels by at least one depressed fastener per roofing panel of the first layer of roofing panels, wherein an exposed fastening member of each depressed fastener is depressed into an adhesive surface of the respective roofing panel of the second layer of roofing panels such that an exposed longitudinal surface of each fastener contacts the adhesive surface of the respective roofing panel of the second layer of roofing panels; and
 providing an adhesive between the first layer and the second layer of roofing panels, wherein, for each fastener of the plurality of fasteners, the fastening members do not perforate completely through the respective roofing panel of the second layer of roofing panels and do not perforate completely through the respective roofing panel of the first layer of roofing panels.

12. A method for installing layers of roofing panels, comprising:
 securing a plurality of roofing panels across a roof deck, the plurality of roofing panels forming a first layer of roofing panels;
 installing a plurality of fasteners to each roofing panel of the first layer of roofing panels, each fastener comprising a base having opposing first longitudinal surface and second longitudinal surface, a fastening member secured to and extending away from the first longitudinal surface and no fastening member secured to and extending away from the second longitudinal surface, wherein the second longitudinal surface of each fastener of the plurality of fasteners includes an adhesive layer that secures the fastener to an upper surface of the respective roofing panel of the first layer of roofing panels such that the fastening member extends upwardly and away from the respective roofing panel of the first layer of roofing panels;
 installing a plurality of roofing panels forming a second layer of roofing panels over the first layer of roofing panels, wherein each roofing panel of the second layer of roofing panels is secured to multiple roofing panels of the first layer of roofing panels by at least one adhered fastener per roofing panel of the first layer of roofing panels, wherein the fastening member of each adhered fastener is depressed into an adhesive surface of the respective roofing panel of the second layer of roofing panels such that an exposed longitudinal surface of each fastener contacts the adhesive surface of the respective roofing panel of the second layer of roofing panels; and
 providing an adhesive between the first layer and the second layer of roofing panels, wherein, for each fastener of the plurality of fasteners, the fastening member does not perforate completely through the respective roofing panel of the second layer of roofing panels.

\* \* \* \* \*